(12) United States Patent
Matsumoto

(10) Patent No.: US 9,783,706 B2
(45) Date of Patent: *Oct. 10, 2017

(54) ADHESIVE TAPE AND ADHESIVE TAPE ROLL

(71) Applicant: BROTHER KOGYO KABUSHIKI KAISHA, Nagoya-shi, Aichi (JP)

(72) Inventor: Haruki Matsumoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/032,497

(22) Filed: Sep. 20, 2013

(65) Prior Publication Data

US 2014/0087182 A1 Mar. 27, 2014

(30) Foreign Application Priority Data

Sep. 27, 2012 (JP) ................. 2012-214828

(51) Int. Cl.
  *C09J 7/02* (2006.01)

(52) U.S. Cl.
  CPC ......... *C09J 7/025* (2013.01); *C09J 2423/005* (2013.01); *C09J 2433/00* (2013.01); *C09J 2433/005* (2013.01); *C09J 2483/005* (2013.01); *Y10T 428/2839* (2015.01)

(58) Field of Classification Search
None
See application file for complete search history.

(56) References Cited

U.S. PATENT DOCUMENTS

| 2,532,011 | A | * | 11/1950 | Dahlquist et al. ........... 428/40.1 |
| 5,480,700 | A | | 1/1996 | Kume et al. |
| 6,132,119 | A | | 10/2000 | Nakajima et al. |
| 2003/0091817 | A1 | * | 5/2003 | Amano ............... B29C 47/0021 428/343 |
| 2009/0264039 | A1 | * | 10/2009 | Takahashi et al. ........... 442/395 |

FOREIGN PATENT DOCUMENTS

| JP | H05263064 | 10/1993 |
| JP | H05278356 | 10/1993 |
| JP | 2533456 | 9/1996 |
| JP | 9095063 | 4/1997 |

(Continued)

OTHER PUBLICATIONS

Polymer Handbook, 3rd Ed., Brandrup and Immergut, eds., John Wiley & Sons, 1989, pp. VII/544, VII/552.*

(Continued)

*Primary Examiner* — Alexandre Ferre
*Assistant Examiner* — Elaine M Vazquez
(74) *Attorney, Agent, or Firm* — McCarter & English, LLP

(57) ABSTRACT

This disclosure discloses an adhesive tape having a dimension in a thickness direction, comprising a tape base layer, an adhesive layer, and a separation layer. The adhesive layer is disposed on one side of the tape base layer in the thickness direction and includes a predetermined adhesive. The separation layer is disposed on the other side of the tape base layer in the thickness direction and includes a silicon separating agent, an olefin resin separating agent, or an acrylic resin separating agent having a long-chain alkyl group.

8 Claims, 8 Drawing Sheets

(56) References Cited

FOREIGN PATENT DOCUMENTS

| | | |
|---|---|---|
| JP | 2001003009 | 1/2001 |
| JP | 2001334758 | 12/2001 |
| JP | 2002-338917 | 11/2002 |
| JP | 2003231211 | 8/2003 |
| JP | 2004-168833 | 6/2004 |
| JP | 2005139394 | 6/2005 |
| JP | 2008-208307 | 9/2008 |
| JP | 2009179719 | 8/2009 |
| JP | 2012038827 | 2/2012 |

OTHER PUBLICATIONS

Bandrup, Immergut, and Grulke, eds., Polymer Handbook 4$^{th}$ Edition, 2003, p. 708.*
Yaws, Carl L.. (2012; 2013; 2014). Yaws' Critical Property Data for Chemical Engineers and Chemists. Knovel.*
Office Action issued in Japanese Application No. 2012-214828 dated Jul. 20, 2016.
Office Action issued in Japanese Application No. 2012-214828 dated Mar. 7, 2016.
Decision to Decline the Amendment issued in Japanese Application No. 2012-214828 dated Nov. 25, 2016.

* cited by examiner

[FIG. 1]
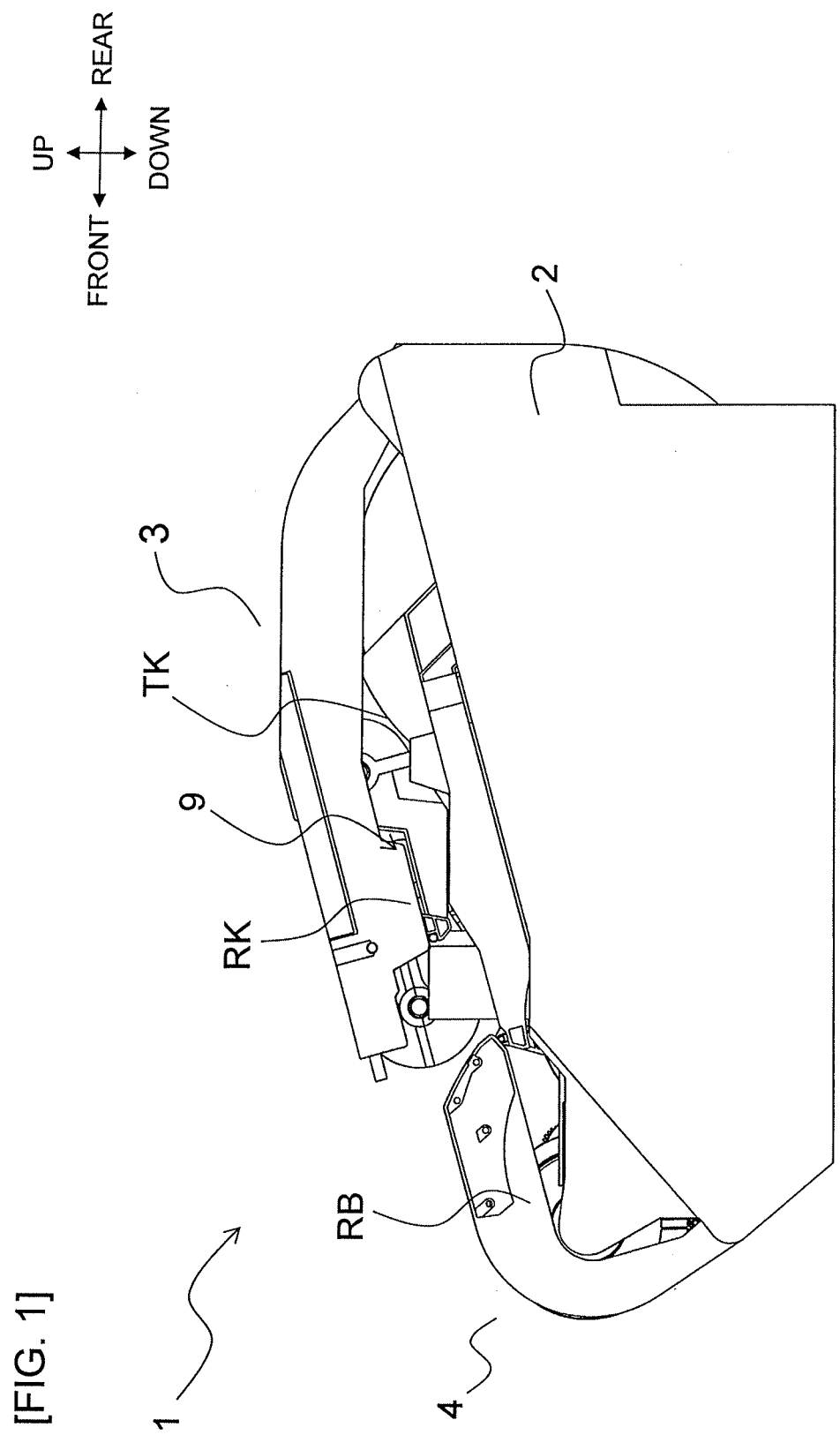

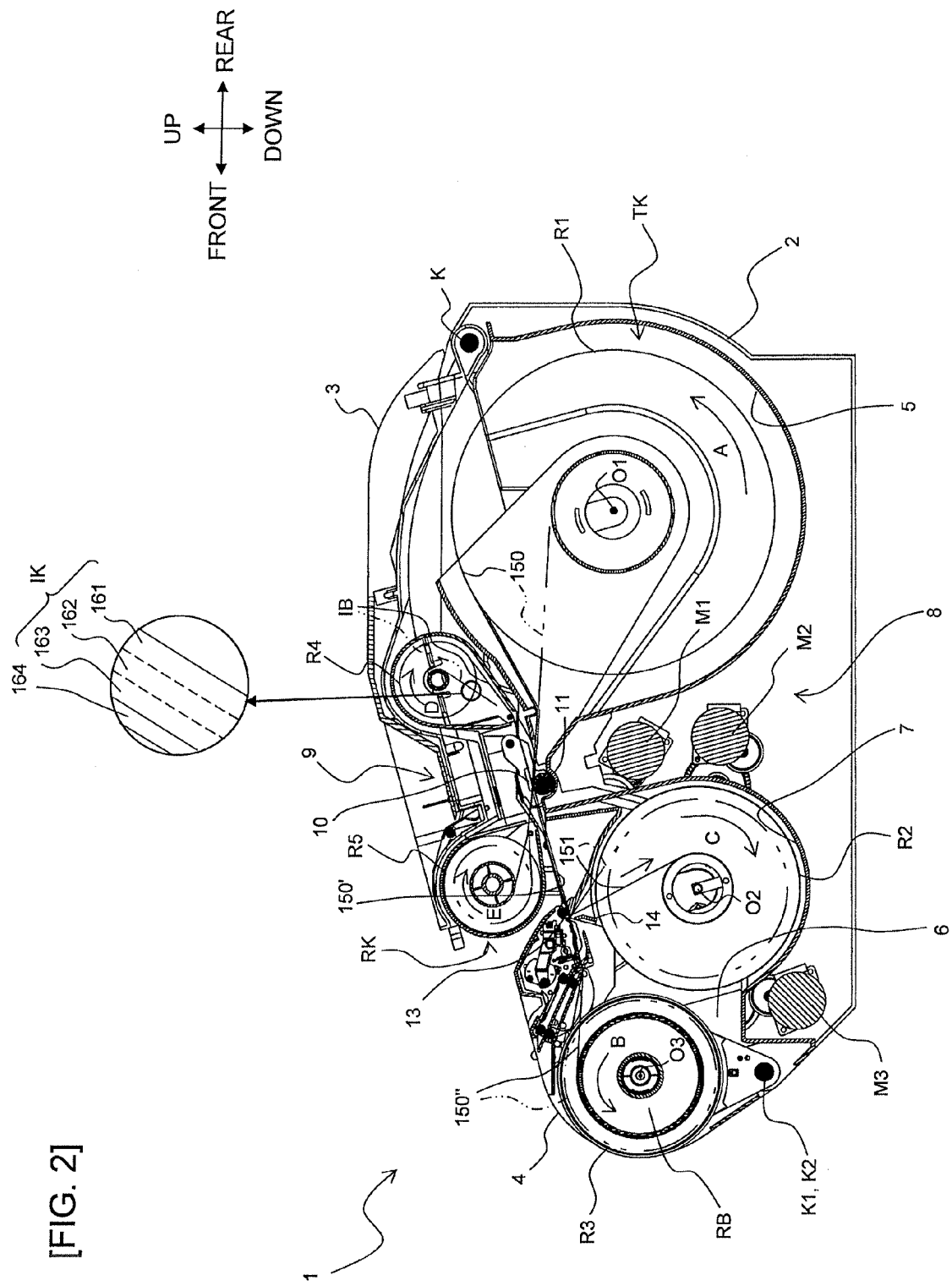

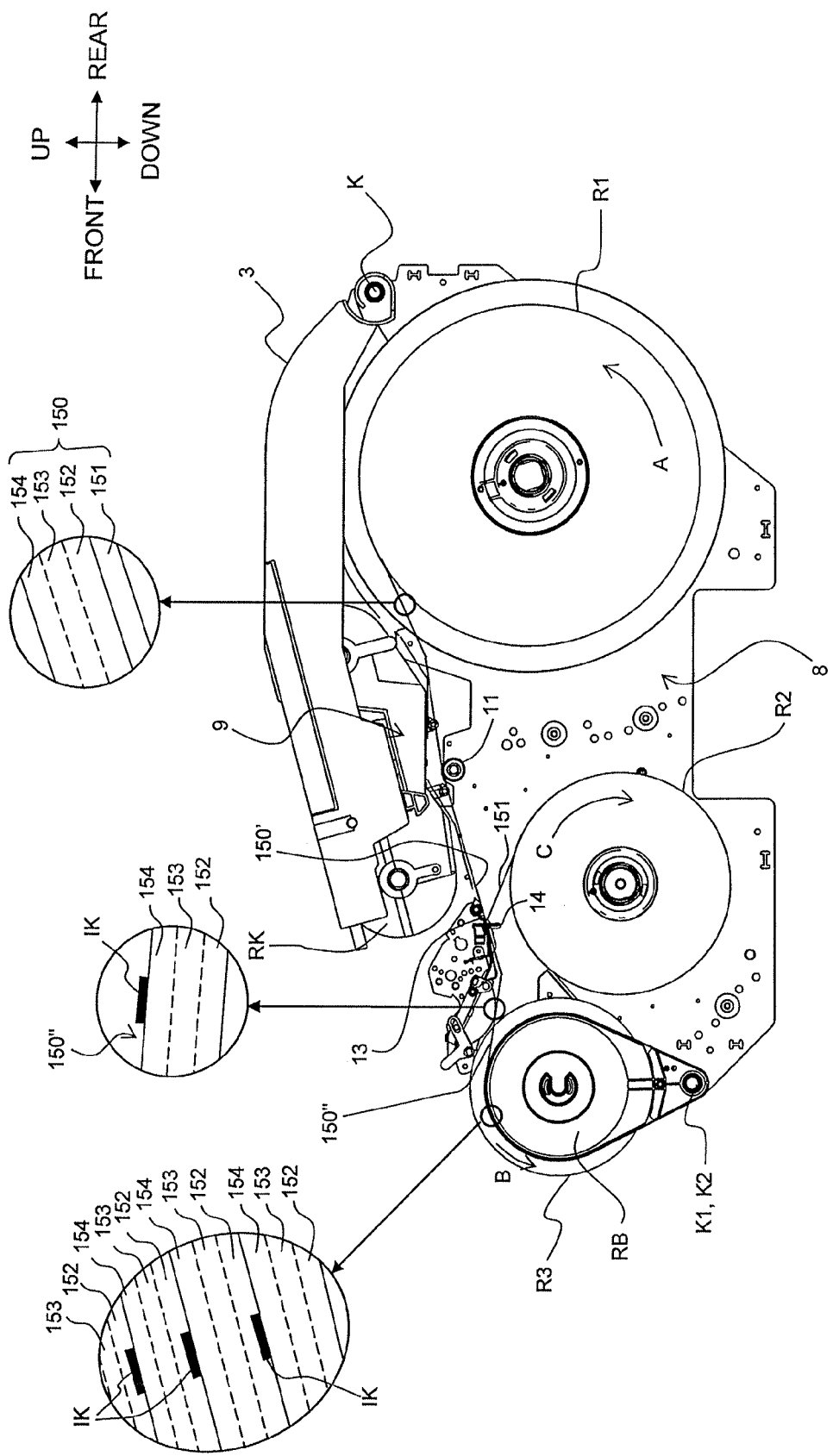
[FIG. 3]

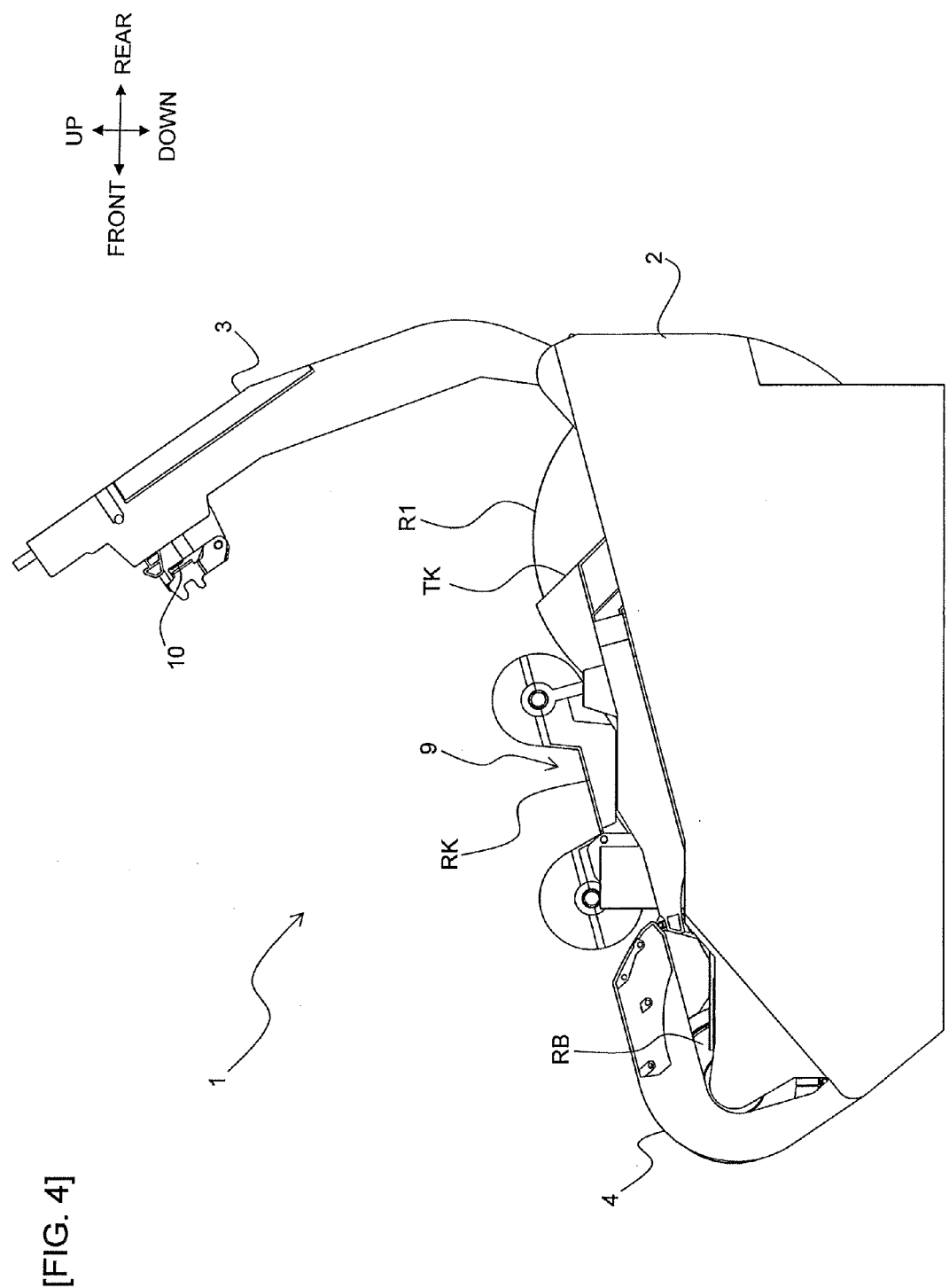

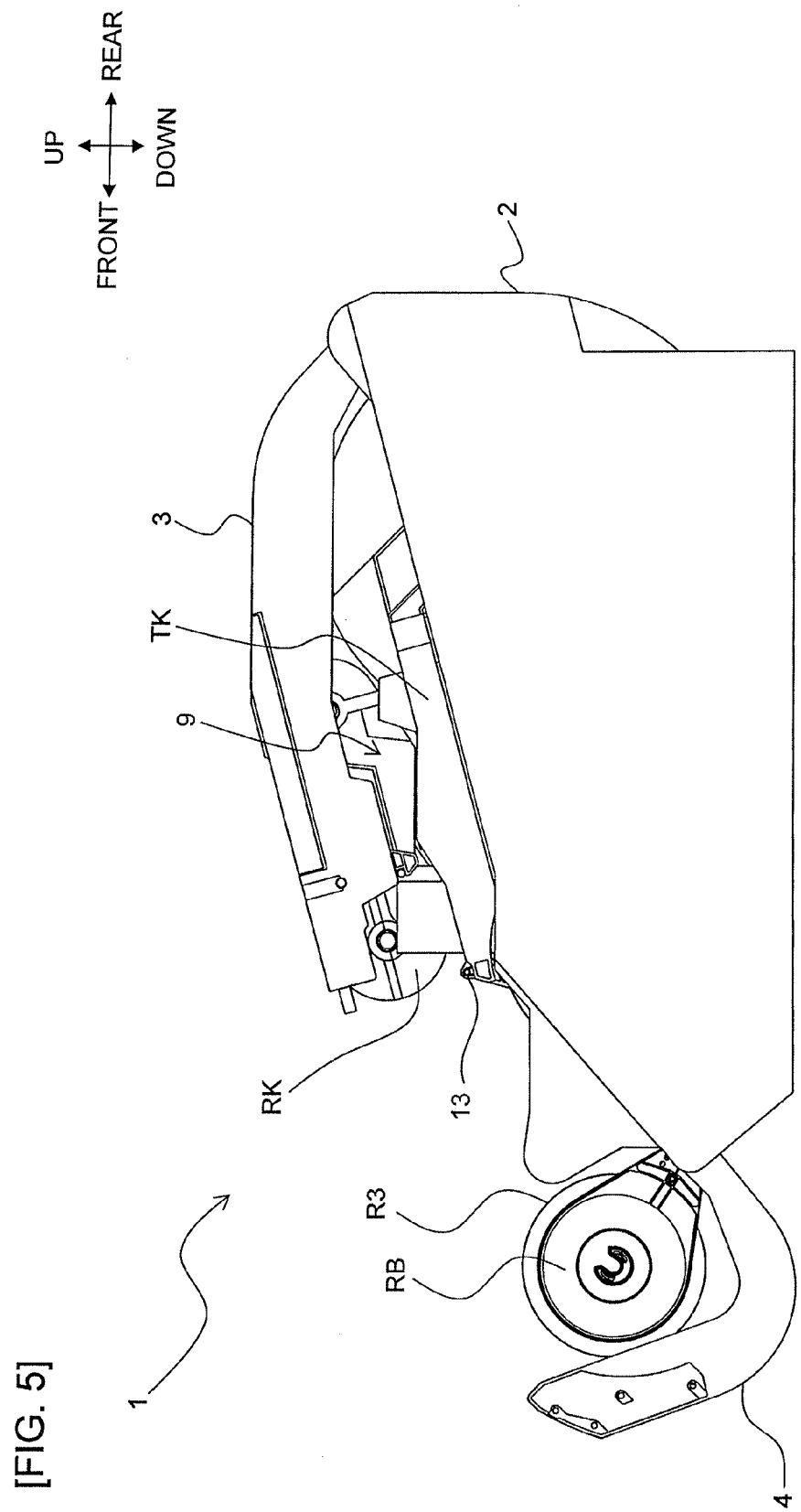

[FIG. 6]
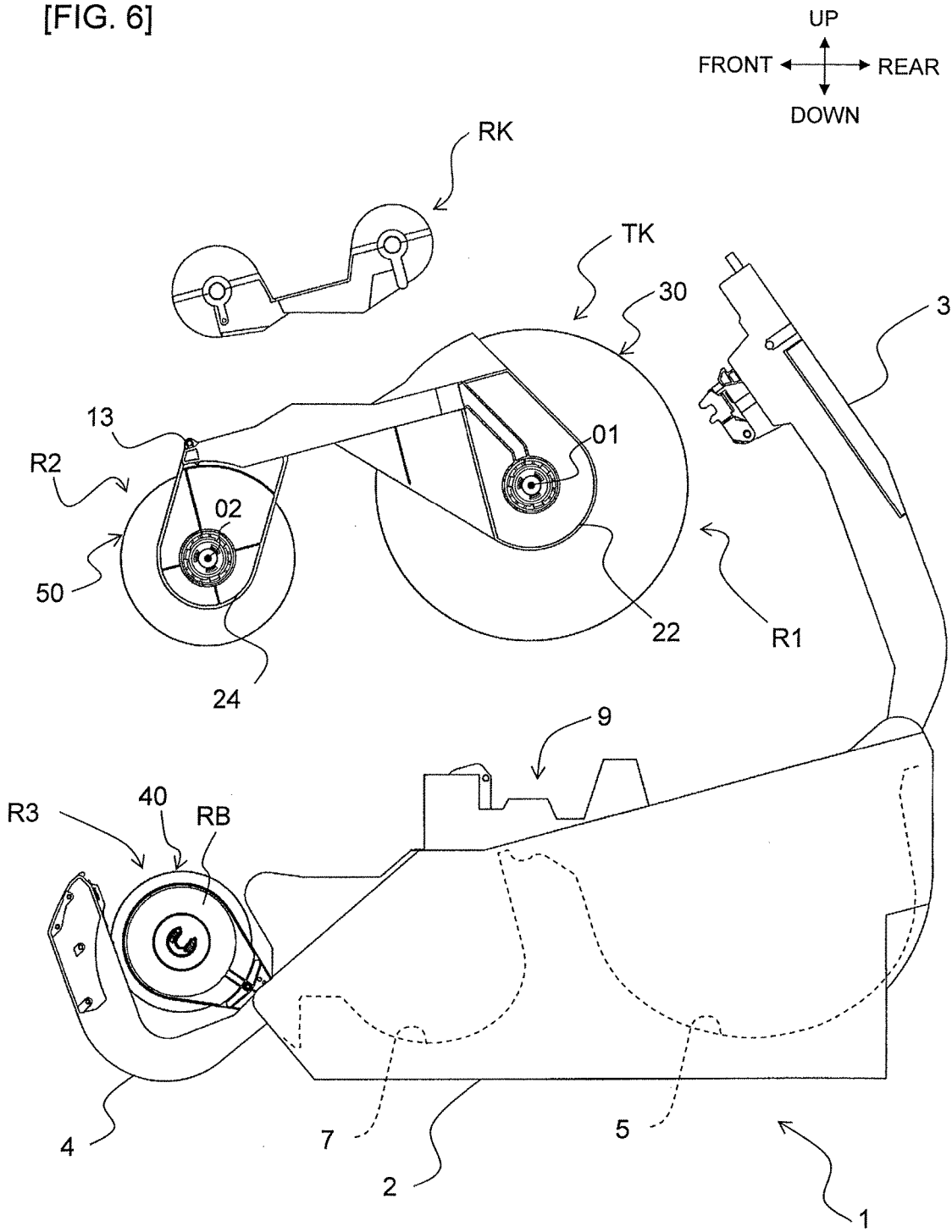

[FIG. 7A]
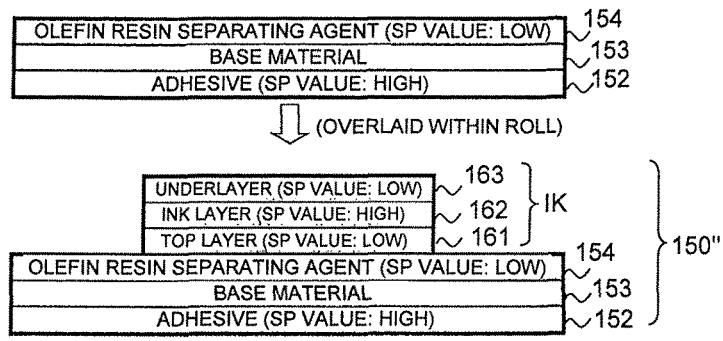
[FIG. 7B]
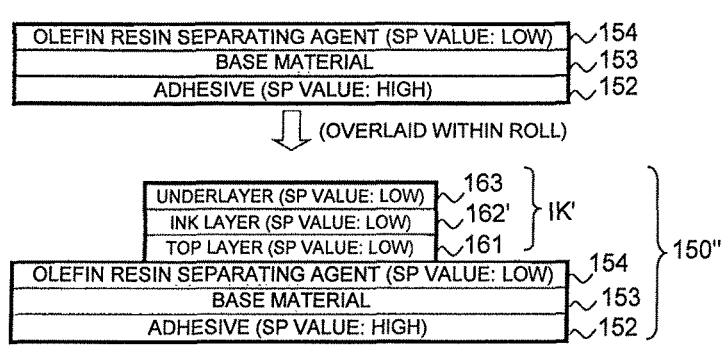
[FIG. 7C]
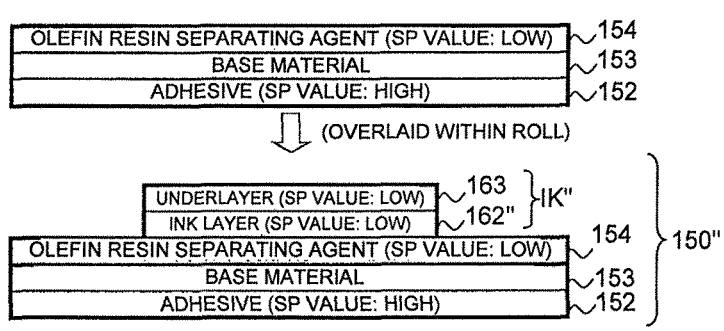
[FIG. 7D]
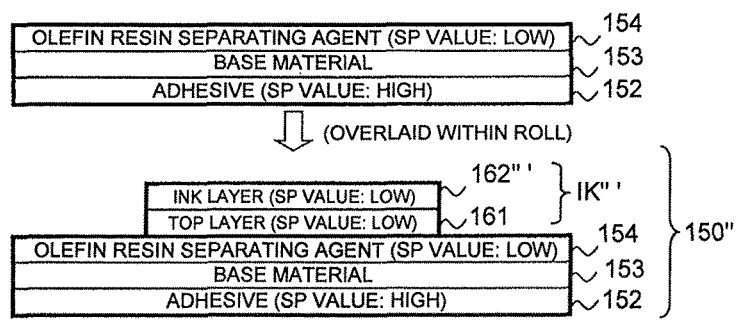

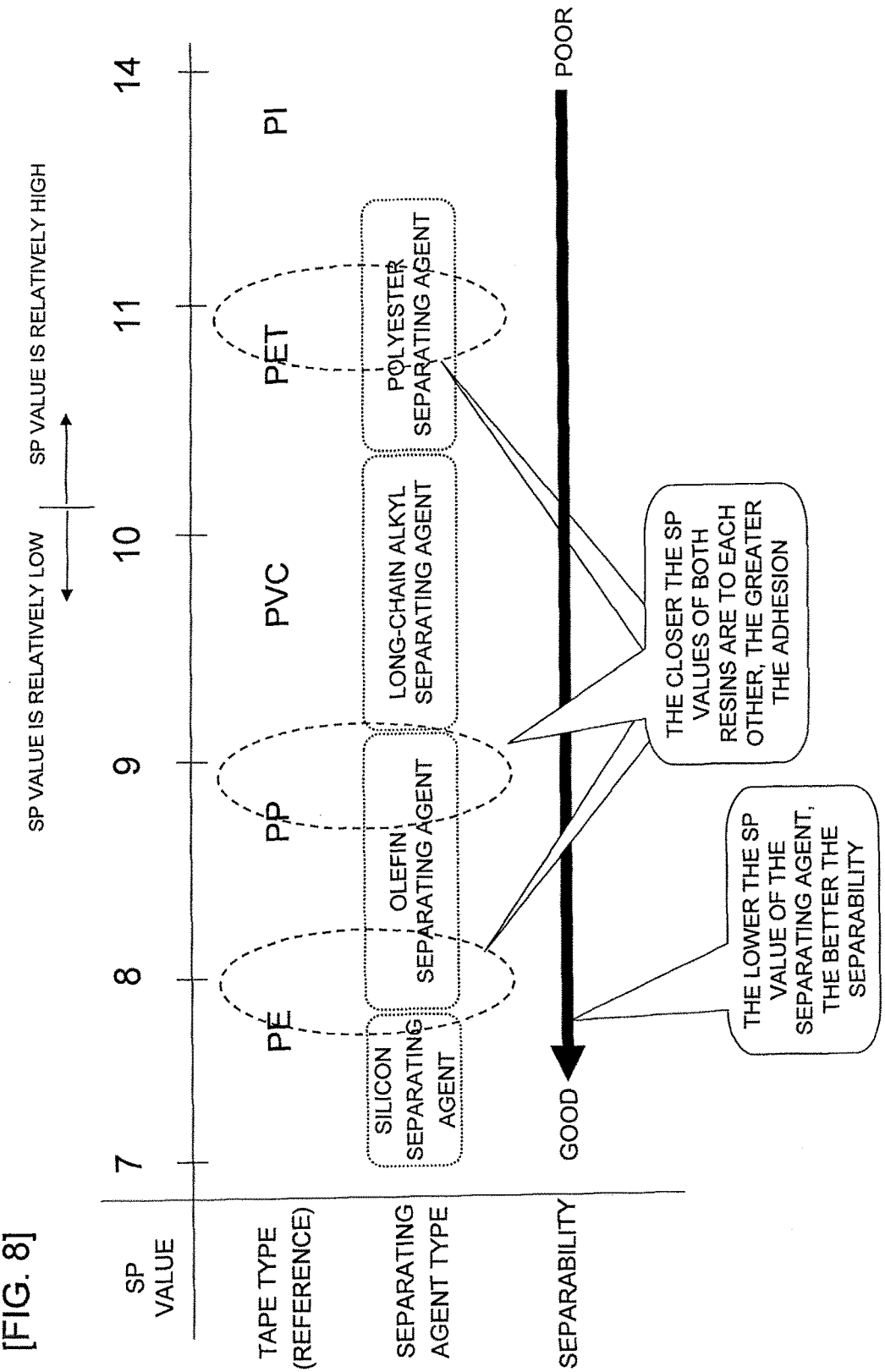
[FIG. 8]

ADHESIVE TAPE AND ADHESIVE TAPE ROLL

CROSS-REFERENCE TO RELATED APPLICATION

The present application claims priority from Japanese Patent Application No. 2012-214828, which was filed on Sep. 27, 2012, the disclosure of which is incorporated herein by reference in its entirety.

BACKGROUND

Field

The present disclosure relates to an adhesive tape that is affixed to an adherent and used, and an adhesive tape roll that uses the same.

Description of the Related Art

There are known adhesive tapes with print that are affixed to an adherent and used. These adhesive tapes include a tape base layer (resin film base), an adhesive layer, and a separation material (separation sheet), in that order, from a front surface side to a rear surface side in the thickness direction. The user uses the adhesive tape of a preferred length by affixing it to a suitable adherent.

When the user affixes and uses the adhesive tape as described above, dirt and debris sometimes stick to the front surface, and it is contemplated that a separation layer could be provided on the front surface of the tape base layer to prevent this. Hence, such an adhesive tape may be conceivably generated as a roll wound around a predetermined axis, for example. In a case where a separation layer is thus provided, the adhesive tape includes a separation layer, a tape base layer, and an adhesive layer, in that order, and thus the adhesive layer in the roll is in contact with and adhered to the separation layer in the radial direction of the roll. Then, when the adhesive tape is fed out from the roll, the adhesive layer is sequentially peeled and separated from the separation layer, requiring consideration for improving the separability thereof as well.

In the prior art described above, achieving an adhesive tape with optimum characteristics that is capable of maintaining separability at the time of feed-out from the roll and antifouling properties when affixed and used as previously described was not taken into account.

SUMMARY

It is therefore an object of the present disclosure to provide an adhesive tape and an adhesive tape roll that are capable of achieving an adhesive tape with optimum characteristics that is capable of maintaining antifouling properties when affixed and used while improving separability at the time of feed-out from the roll.

In order to achieve the above-described object, according to the aspect of the present application, there is provided an adhesive tape having a dimension in a thickness direction, comprising a tape base layer, an adhesive layer disposed on one side of the tape base layer in the thickness direction and including a predetermined adhesive, and a separation layer disposed on the other side of the tape base layer in the thickness direction and including a silicon separating agent, an olefin resin separating agent, or an acrylic resin separating agent having a long-chain alkyl group.

The adhesive tape of the present disclosure forms a layered structure which includes a separation layer, a tape base layer, and an adhesive layer, in that order, from the other side (upper side, for example) to one side (lower side, for example) in the thickness direction. The user can use this adhesive tape as a label or sealing material for packaging, for example, by affixing the adhesive tape of a preferred length to a suitable adherent. At this time, the separation layer is provided to the one side of the tape base layer, thereby causing the front surface to be less susceptible to the sticking of dirt and debris when used as a label or sealing material as described above, making it possible to maintain antifouling properties.

Further, the adhesive tape of the present disclosure may be generated as a roll wound around a predetermined axis, for example. The adhesive tape includes the separation layer, tape base layer, and adhesive layer, in that order, as previously described, and thus the adhesive layer in the roll is in contact with and adhered to the separation layer in the radial direction of the roll. The separation layer is provided with the object of making the adhesion with this adhesive layer readily reseparable and, when the adhesive tape is fed out from the roll, the adhesive layer is sequentially peeled and separated from the separation layer.

Then, according to the present disclosure, to improve the separability at this time (to make the adhesive layer peel via a lighter load), the separation layer comprises an olefin resin separating agent or an acrylic resin separating agent comprising a long-chain alkyl group with a relatively low solubility parameter value. With this arrangement, it is possible to improve the separability from the separation layer when the adhesive tape is fed out from the roll.

BRIEF DESCRIPTION OF THE DRAWINGS

FIG. 1 is a right side view showing an outer appearance of the adhesive tape printer of an embodiment of the present disclosure.

FIG. 2 is a vertical cross-sectional view showing the internal structure of the adhesive tape printer.

FIG. 3 is an explanatory view showing the tape transport path of the adhesive tape printer.

FIG. 4 is a right side view showing the outer appearance of the adhesive tape printer with only the first opening/closing cover open.

FIG. 5 is a right side view showing the outer appearance of the adhesive tape printer with only the second opening/closing cover open.

FIG. 6 is an exploded side view showing the adhesive tape printer with the first and second opening/closing covers open and the adhesive tape cartridge and ribbon cartridge removed.

FIG. 7A is a cross-sectional view conceptually showing the layered structure of the adhesive tape with print of the embodiment.

FIG. 7B is a cross-sectional view conceptually showing a modification wherein the SP value of the ink layer is decreased.

FIG. 7C is a cross-sectional view conceptually showing a modification wherein the top layer is omitted.

FIG. 7D is and a cross-sectional view conceptually showing a modification wherein the underlayer is omitted.

FIG. 8 is an explanatory view explaining the relationship between the separation material type and separability quality as well as the size of the solubility parameter.

DETAILED DESCRIPTION OF PREFERRED EMBODIMENTS

The following describes one embodiment of the present disclosure with reference to accompanying drawings. Note that, in a case where "Front," "Rear," "Left," "Right," "Up," and "Down" are denoted in the following drawings, the terms "Front," "Rear," "Left," "Right," "Up (Above)," and "Down (Below)" in the explanations in the description refer to the denoted directions.

General Configuration of Adhesive Tape Printer

First, the general configuration of the adhesive tape printer according to this embodiment will be described with reference to FIGS. 1-6.

In FIGS. 1-6, the adhesive tape printer 1 comprises a housing 2 that constitutes the apparatus outer frame, a first opening/closing cover 3, a second opening/closing cover 4, a first storage part 5, a second storage part 7, and a third storage part 6. The first opening/closing cover 3 is provided to the upper rear side of the housing 2. The second opening/closing cover 4 is provided to the upper front side of the housing 2. The first storage part 5 is provided to the rear side of the housing 2. The second storage part 7 and the third storage part 6 are provided to the front side of the housing 2.

At this time, an adhesive tape cartridge TK is detachably mounted in a first predetermined position 8 located below the first opening/closing cover 3 (in a closed state) of the housing 2. The adhesive tape cartridge TK comprises a first roll R1 (details described later) on the rear side, and a second roll R2 (details described later) on the front side.

The first roll R1 is received from above in the first storage part 5 by the mounting of the adhesive tape cartridge TK, and stored in a state in which an axis O1 of the substantially horizontal direction is in the substantially horizontal direction (specifically, left-right direction). The first roll R1 winds a print-receiving adhesive tape 150 comprising a preferred width direction dimension around the axis O1. Note that, in FIG. 2, the state in which the print-receiving adhesive tape 150 of the first roll R1 is not consumed is indicated by a solid line, and the state in which the print-receiving adhesive tape 150 of the first roll R1 is consumed to a certain degree is indicated by an imaginary line.

At this time, as shown in FIG. 6, a first core member 30 for forming the first roll R1 is provided to the rear side of the adhesive tape cartridge TK. Then, with this first core member 30 supported by a left and right pair of first bracket parts 22 and 22, the first roll R1 is rotatably (in direction A in FIG. 2 and FIG. 3) supported inside the first storage part 5 in the state stored in the first storage part 5 (in the state in which the adhesive tape cartridge TK is mounted).

The print-receiving adhesive tape 150, as shown in FIG. 3, is layered in the order of a separation material 151, an adhesive layer 152, a base layer 153, and a separating agent layer 154, from one side (the lower side in FIG. 3 in this example) to the other side (the upper side in FIG. 3 in this example) in the thickness direction. That is, in this example, the separating agent layer 154 is positioned as the uppermost layer, and the separation material 151 is positioned as the lowermost layer. The separating agent layer 154 is a layer where preferred print is formed by a print head 10 described later, and is a layer for preventing dirt and debris from sticking to the front surface when a print-receiving adhesive tape 150" (details described later) after print formation is used as a label or sealing material by the user, thereby maintaining antifouling properties. The adhesive layer 152 is a layer for affixing the base layer 153 to a suitable adherent (not shown). The separation material 151 is a layer that covers the adhesive layer 152.

The first opening/closing cover 3 at this time is capable of opening and closing above the first storage part 5 by pivoting around a predetermined pivot axis K provided at the rear side end of the housing 2. Specifically, the first opening/closing cover 3 is pivotable from a closed position where the rear side of the housing 2 is covered (the state of FIG. 1, FIG. 2, FIG. 3, and FIG. 5) to an open position where the rear side of the housing 2 is exposed (the state of FIG. 4 and FIG. 6).

Further, the print head 10 and a feeding roller 11 are disposed facing each other in the up-down direction on the upper side of the substantial middle of the housing 2 interior communicated with the first storage part 5 and the second storage part 7.

The feeding roller 11 feeds the print-receiving adhesive tape 150 fed out from the first roll R1 stored in the first storage part 5 in a tape posture in which the tape width direction is in the substantially horizontal direction (specifically, in the left-right direction) [in other words, in a tape posture where the tape transverse cross-section is set as the substantially horizontal direction (specifically, in the left-right direction)]. Further, this feeding roller 11 is driven by a feeding motor M1 via a gear mechanism. The feeding motor M1 is provided between the first storage part 5 and the second storage part 7 as well as the third storage part 6 disposed in a divided manner on a rear side and a front side as described above (further on the front side than the first storage part 5, and further on the rear side than the second storage part 7 and the third storage part 6), so that the axial direction of an output shaft (not shown) is in the substantial horizontal direction (specifically, the left-right direction). Note that the feeding roller 11 is provided substantially above the feeding motor M1 in this example.

The print head 10 is provided on an area of the first opening/closing cover 3 substantially upwardly facing the feeding roller 11 so that it sandwiches the fed print-receiving adhesive tape 150 in coordination with the feeding roller 11. Then, the print head 10 forms preferred print on the above described separating agent layer 154 of the fed print-receiving adhesive tape 150 using an ink ribbon IB of a ribbon cartridge RK described later, thereby forming an adhesive tape 150' with print.

That is, the ribbon cartridge RK is detachably mounted in a second predetermined position 9, which is below the first opening/closing cover 3 (in a closed state) of the housing 2 and above the adhesive tape cartridge TK. The ribbon cartridge RK rotatably (in direction D in FIG. 2) comprises a ribbon supply roll R4 on the rear side, and rotatably (in direction E in FIG. 2) comprises a ribbon take-up roll R5 on the front side. The ribbon supply roll R4 winds the ink ribbon IB for performing print formation by the print head 10 around a predetermined axis, and feeds out this ink ribbon IB. The ribbon take-up roll R5 takes up the used ink ribbon IB after print formation. The ribbon cartridge RK is mounted to the second predetermined position 9, disposing the ribbon supply roll R4 further toward the rear side than the print head 10 and the feeding roller 11, and the ribbon take-up roll R5 further toward the front side than the print head 10 and the feeding roller 11. Note that, in FIG. 2, the state in which the ink ribbon IB of the ribbon supply roll R4 is not consumed and the used ink ribbon IB is not yet wound around the ribbon take-up roll R5 is indicated by a solid line, and the state in which the ink ribbon IB of the ribbon supply roll R4 was consumed to a certain degree and the used ink ribbon IB was wound around the ribbon take-up roll R5 to a certain degree is indicated by an imaginary line.

Then, the ink ribbon IB fed out from the ribbon supply roll R4 contacts the area below the print head 10. At this time, the ink ribbon IB, as shown in FIG. 2, forms a layered structure (of four layers in this example), comprising a ribbon base layer 164, an underlayer 163 that melts by predetermined heat reception and separates from the ribbon base layer 164, a top layer 161 that sticks to a transfer target, and an ink layer 162 that is positioned in the middle between the top layer 161 and the underlayer 163 in the thickness direction. Then, the above described underlayer 163 melts by the heat received due to the heating from the print head 10, causing a transfer layer IK comprising the underlayer 163, the ink layer 162, and the top layer 161 to separate from the above described ribbon base layer 164. Then, the top layer 161 side of the transfer layer IK sticks to the separating agent layer 154 of the print-receiving adhesive tape 150, which is the transfer target (refer to FIG. 7 described later). With this arrangement, after the ink of the ink ribbon IB performs print formation on the separating agent layer 154 of the fed print-receiving adhesive tape 150 to generate the above described adhesive tape 150' with print, the used ink ribbon IB is taken up on the ribbon take-up roll R5. Note that the ribbon cartridge RK is attachable and detachable with respect to the second predetermined position 9 by setting the first opening/closing cover 3 to an open state with the second opening/closing cover 4 in a closed state as is, as shown in FIG. 4.

A third roll R3 is received from above in the third storage part 6, and stored in a state in which an axis O3 of the substantially horizontal direction is in the substantially horizontal direction (specifically, the left-right direction). The third roll R3 winds a tape from which the separation material 151 was peeled from the adhesive tape 150' with print (a tape that includes the tape main body comprising the separating agent layer 154, the base layer 153, and the adhesive layer 152, as well as the transfer layer IK; refer to FIG. 3; hereinafter suitably and simply called the "adhesive tape 150" with print") around the axis O3. Note that, in FIG. 2, the state in which the adhesive tape 150" with print is not yet wound around the third roll R3 is indicated by a solid line, and the state in which the adhesive tape 150" with print is wound around the third roll R3 to a certain degree is indicated by an imaginary line. At this time, as shown in FIG. 6, a third core member 40 for forming the third roll R3 is provided inside the housing 2 on the second opening/closing cover 4 side. Then, this third core member 40 is supported by a support bracket RB, causing the third roll R3 to be rotatably (in direction B in FIG. 2 and FIG. 3) supported inside the third storage part 6. That is, the third roll R3 is connected to a take-up motor M3 via a gear mechanism, and driven to execute take-up by the take-up motor M3. This take-up motor M3 is provided below in the substantial middle between the second storage part 7 and the third storage part 6.

Further, the second opening/closing cover 4 at this time is capable of opening and closing above the third storage part 6 by pivoting around a predetermined first pivot axis K1 provided at the front side end of the housing 2. Specifically, the second opening/closing cover 4 is pivotable from a closed position where the third storage part 6 of the housing 2 is covered (the state of FIG. 1, FIG. 2, FIG. 3, and FIG. 4) to an open position where the third storage part 6 is exposed (the state of FIG. 5 and FIG. 6). Note that the third roll R3, as shown in FIG. 5, is attachable and detachable with respect to the third storage part 6 by setting the second opening/closing cover 4 to an open state with the first opening/closing cover 3 in a closed state as is.

The support bracket RB comprises two brackets provided facing each other with the third roll R3 sandwiched between both sides of the third roll R3 along the axis O3 direction, and the third roll R3 (the third core member 40) is rotatably supported around a predetermined second pivot axis K2 provided at the front side end of the housing 2. That is, the support bracket RB is pivotably configured from a use position (the position shown in FIGS. 1-4) where it is positioned on the closed direction side of the second opening/closing cover 4 where the third roll R3 is not attachable or detachable, to a removal position (the position shown in FIG. 5 and FIG. 6) where it is positioned on the open direction side of the second opening/closing cover 4 where the third roll R3 is attachable and detachable, around the second pivot axis K2. Note that, in this example, the second pivot axis K2 is in the same position as the above described first pivot axis K1 (that is, a common axis).

The second roll R2 is received from above in the second storage part 7 by the mounting of the adhesive tape cartridge TK, and stored in a state in which an axis O2 of the substantially horizontal direction is in the substantially horizontal direction (specifically, left-right direction). The second roll R2 winds the separation material 151 separated from the adhesive tape 150" with print and peeled from the adhesive tape 150' with print, around the axis O2. Note that, in FIG. 2, the state in which the separation material 151 is not yet wound around the second roll R2 is indicated by a solid line, and the state in which the separation material 151 is wound around the second roll R2 to a certain degree is indicated by an imaginary line. At this time, as shown in FIG. 6, a second core member 50 for forming the second roll R2 is provided to the front side of the adhesive tape cartridge TK. Then, with the second core member 50 supported by a left and right pair of second bracket parts 24 and 24, the second roll R2 is rotatably (in direction C in FIG. 2 and FIG. 3) supported inside the second storage part 7 in the state stored in the second storage part 7 (in the state in which the adhesive tape cartridge TK is mounted). That is, the second roll R2 is connected to a take-up motor M2 via a gear mechanism, and driven to execute take-up by the take-up motor M2. The take-up motor M2 is provided below the above described feeding motor M1.

Further, a cutter mechanism 14 is disposed in an area further on the rear side than the third roll R3 of the second opening/closing cover 4 when the second opening/closing cover 4 is in a closed state. The cutter mechanism 14 is a mechanism for cutting the adhesive tape 150" with print after the separation material 151 is peeled at a peeling part 13 described later.

Summary of Apparatus Operation

Next, an overview of the operation of the adhesive tape printer 1 will be described.

That is, when the adhesive tape cartridge TK is mounted to the first predetermined position 8, the first roll R1 is stored in the first storage part 5, and the second roll R2 is stored in the second storage part 7. Then, when the feeding roller 11 is driven, the print-receiving adhesive tape 150 fed out by the rotation of the first roll R1 is fed to the front side. Then, preferred print is formed by the transfer of the transfer layer IK of the ink ribbon IB due to the heating of the print head 10 to the separating agent layer 154 of the fed print-receiving adhesive tape 150, thereby forming the adhesive tape 150' with print. Subsequently, when the adhesive tape 150' with print is further fed to the front side and introduced to the above described peeling part 13, the separation material 151 is peeled at the peeling part 13. The peeled separation material 151 is fed to the lower side, introduced to the second storage part 7, and wound inside the second storage part 7, forming the second roll R2.

On the other hand, the adhesive tape 150" with print from which the separation material 151 was peeled is further fed to the front side, introduced to the third storage part 6, and wound inside the third storage part 6, thereby forming the third roll R3. At that time, the cutter mechanism 14 provided further to the rear side than the third roll R3, that is, on the upstream side along the transport path, cuts the adhesive tape 150" with print on which print was formed and from which the separation material 151 was peeled. With this arrangement, the adhesive tape 150" with print wound around the third roll R3 can be cut and the third roll R3 can be removed from the third storage part 6 after cutting based on a timing preferred by the user.

Special Characteristics of the Embodiment

In the above basic configuration, the special characteristics of this embodiment lie in the improvement of separability at the time of tape feed-out of the first roll R1 and the third roll R3, the improvement of transferability of the ink ribbon IB to the print-receiving adhesive tape 150, and the layer structure of the print-receiving adhesive tape 150 and the ink ribbon IB which improves the antifouling properties of the adhesive tape 150" with print. In the following, details on the functions will be described in order.

Overview of Layered Structure of the Adhesive Tape with Print

FIG. 7A conceptually shows the layered structure of the above described adhesive tape 150" with print of this embodiment.

As shown in FIG. 7A, the adhesive tape 150" with print comprises the separating agent layer 154, the base layer 153, the adhesive layer 152, and the transfer layer IK formed by transfer from the ink ribbon IB, as previously described.

The following types of materials can be used as the base that forms the base layer 153, for example:

1. Polyethylene (PE), polypropylene (PP), ethylene-vinyl acetate copolymer (EVA), ethylene-methacrylic acid copolymer (EMMA), polybutene (PB), polybutadiene (BDR), polymethylpentene (PMP), polyethylene terephthalate (PET), polyethylene naphthalate (PEN), polybutyrene terephthalate (PBT), polyimide (PI), polyether imide (PEI), polyether ketone (PEK), polyether ether ketone (PEEK), nylon (NY), polyamide (PA), polycarbonate (PC), polystyrene (PS), formed polystyrene (FS/EPS), polyvinyl chloride (PVC), polyvinylidene chloride (PVDC), ethylene-vinyl alcohol copolymer (EVOH), polyvinyl alcohol (PVA), common cellophane (PT), moisture-proof cellophane (MST), polyacrylonitrile (PAN), vinylon (VL), polyurethane (PU), triacetylcellulose (TAC);
2. Metallic foil <aluminum foil (AI), copper foil>, vacuum deposition (common aluminum) film (VM);
3. Paper, such as high quality paper, clean room paper, glassine paper, clay coated paper, resin coated paper, laminated paper (polyethylene laminated paper, polypropylene laminated paper, etc.), YUPO (synthetic) paper, craft paper;
4. Nonwoven fabric; and
5. Glass cloth The separating agent layer 154 is provided on the other side (upper side in the figure) of the base layer 153 in the above described thickness direction, and comprises an olefin resin separating agent (or an acrylic resin separating agent comprising a long-chain alkyl group). The solubility parameter value (hereinafter suitably referred to as "SP value") of the separating agent layer 154 is a relatively low value greater than or equal to 7 and less than or equal to 9, for example.

Note that a crystalline olefin resin is used as the above described olefin resin separating agent that forms the separating agent layer 154. Examples of this crystalline olefin resin include the following:

1. Ethylene resin (branched low-density polyethylene, straight-chain low-density polyethylene, high-density polyethylene); and
2. Polypropylene resin (also may be expressed as propylene homopolymer, propylene-α-olefin copolymer, or stereoregular α-olefin resin. Further, the above described crystalline olefin resin may be used singly or in combinations of two or more types.)

Further, examples of the above described long-chain alkyl separating agent that forms the separating agent layer 154 include the following:

1. Long-Chain Alkyl Group-Containing Compounds

A compound obtained by reacting a long-chain alkyl isocyanate→a compound comprising a long-chain alkyl group of 8-30 carbons on a side chain. Note that when the above described number of carbons is less than eight, difficulties in ensuring separation performance arise. Further, when the number of carbons exceeds 30, difficulties in availability and handling arise. Such polymers with separability include reaction products, acrylic polymers, and the like, such as a urethane polymer with alkyl isocyanate as a raw material component. Further, the reaction products can be produced by reacting alkyl isocyanate, which comprises a long-chain alkyl group of 8-30 carbons, with a polyvinyl alcohol polymer, polyethyleneimine, and the like. Examples include a reaction of polyvinyl alcohol polymer+long-chain alkyl isocyanate→polyvinyl carbamate or polyethyleneimine+long-chain alkyl isocyanate→alkyl urea derivative, etc.

The adhesive layer 152 is provided on one side (the lower side in the figure) of the base layer 153 in the above described thickness direction, and comprises a predetermined adhesive, such as an acrylic adhesive, for example. The SP value of the adhesive layer 152 is a relatively high value greater than 9 and less than or equal to 14, for example.

The transfer layer IK comprises the underlayer 163, the ink layer 162, and the top layer 161, as previously described.

The underlayer 163 is formed on the front surface of the other side (the upper side in the figure) of the transfer layer IK in the above described thickness direction, and melts by predetermined heat reception, separating from the ribbon base layer 164 of the ink ribbon IB, as previously described. The SP value of the underlayer 163 is a relatively low value greater than or equal to 7 and less than or equal to 9, for example.

The top layer 161 is formed on the front surface of one side (the lower side in the figure) of the transfer layer IK in the above described thickness direction, and sticks to the transfer target. The SP value of the top layer 161 is a relatively low value greater than or equal to 7 and less than or equal to 9, for example.

The ink layer 162 comprises a predetermined pigment. The SP value of the ink layer 162 is a relatively high value greater than 9 and less than or equal to 11, for example.

Improvement of Antifouling Properties

The above described adhesive tape 150" with print is configured by forming the transfer layer IK on the separating agent layer 154, the base layer 153, and the adhesive layer 152 by transfer from the ink ribbon IB, as previously described. Then, after removing the adhesive tape 150" with print wound around the third roll R3 from the second storage part 7 at suitably timing as previously described, the user can use the adhesive tape 150" with print as a label or sealing material for packaging, for example, by feeding out the adhesive tape 150" with print of a preferred length from the third roll R3 and affixing it to a suitable adherent. The adhesive tape 150" with print at this time forms a layered structure that includes the separating agent layer 154, the base layer 153, and the adhesive layer 152, in that order (refer to FIG. 3 and the like as well). The separating agent layer 154 is provided on one side (that is, the side opposite the side affixed to the adherent) of the base layer 153 of the adhesive tape 150" with print in the above described thickness direction, thereby causing the front surface to be less susceptible to the sticking of dirt and debris when the adhesive tape 150" with print is used as a label or sealing material as described above, making it possible to maintain antifouling properties.

Improvement of Separability

Hence, since the adhesive tape 150" with print includes the separating agent layer 154, the base layer 153, and the adhesive layer 152, in that order, as previously described, the adhesive layer 152 in the above described third roll R3 is in contact with and adhered to the separating agent layer 154 in the radial direction of the third roll R3 in all sections other than the section where the transfer layer IK is transferred, as shown in FIG. 7A (refer to FIG. 3 as well). The above described separating agent layer 154 is provided also with the object of making the adhesion with this adhesive layer 152 more readily reseparable. That is, when the adhesive tape 150" with print is fed out from the third roll R3 as described above, the above described adhesive layer 152 sequentially peels and separates from the separating agent layer 154. Then, according to this embodiment, to improve separability at this time (to make the adhesive layer 152 peel via a lighter load), the separating agent layer 154 comprises an olefin resin separating agent (or acrylic resin separating agent comprising a long-chain alkyl group) with a relatively low SP value (greater than or equal to 7 and less than or equal to 9; refer to FIG. 8). With this arrangement, it is possible to improve the separability from the separating agent layer 154 at the time of feed-out of the adhesive tape 150" with print from the above described third roll R3.

Improvement of Transferability and the Like

On the other hand, as shown in FIG. 7A, the transfer layer IK forms a layered structure that includes the underlayer 163, the ink layer 162, and the top layer 161, in that order, from the other side (upper side in the figure) to one side (lower side in the figure) in the above described thickness direction (refer to FIG. 2 as well). That is, at the time of transfer from the ink ribbon IB, the above described top layer 161 positioned on the front surface of one side of the transfer layer IK in the above described thickness direction is formed adjacent to the other side of the above described separating agent layer 154 in the above described thickness direction. To ensure favorable transferability, it is necessary to increase the adhesion between the adjacent separating agent layer 154 and the top layer 161, and thus the difference between the SP value of the separating agent layer 154 and the SP value of the top layer 161 is preferably relatively small (refer to FIG. 8).

Hence, as previously described, the separating agent layer 154 comprises an olefin resin separating agent (or an acrylic resin separating agent comprising a long-chain alkyl group), and has a relatively low SP value. Hence, according to this embodiment, even for the above described top layer 161, a material with a relatively low SP value greater than or equal to 7 and less than or equal to 9 is adopted, and not a material with an SP value of about 11 such as the ink ribbon IB used for regular tape printing (refer to FIG. 7A and FIG. 8). With this arrangement, it is possible to increase the adhesion between the top layer 161 and the separating agent layer 154, and improve the transferability when the transfer layer IK is transferred from the ink ribbon IB.

Further, in a case where the adhesive tape 150" with print is wound as the third roll R3 as described above, the adhesive layer 152 and the separating agent layer 154 are in contact in the radial direction of the third roll R3 in all sections other than the section where the transfer layer IK is transferred, as previously described (refer to FIG. 3 and FIG. 7A). From the viewpoint of the above described adhesion, it is necessary to decrease the adhesion between the adhesive layer 152 and the separating agent layer 154, and thus the difference between the SP value of the adhesive layer 152 and the SP value of the separating agent layer 154 is preferably relatively large. Since the SP value of the separating agent layer 154 is relatively low as described above, the adhesive layer 152 with a relatively high SP value is adopted, according to this embodiment (refer to FIG. 7A).

On the other hand, at this time, in a case where the adhesive tape 150" with print is wound as the above described third roll R3, the adhesive layer 152 and the underlayer 163 positioned on the front surface of the other side (the upper side in FIG. 7A) of the transfer layer IK in the above described thickness direction are in contact in the radial direction of the third roll R3 in the section where the transfer layer IK is transferred (refer to FIG. 3 and FIG. 7A). From the viewpoint of the above described adhesion, it is necessary to decrease the adhesion between the underlayer 163 and the adhesive layer 152, and thus the difference between the SP value of the underlayer 163 and the SP value of the adhesive layer 152 is preferably relatively large (refer to FIG. 8). For the above described reasons, since the adhesive layer 152 with a relatively high SP value is used, the SP value of the underlayer 163 is preferably relatively low, according to this embodiment. Hence, according to this embodiment, even for the underlayer 163, a material with a relatively low SP value greater than or equal to 7 and less than or equal to 9 is adopted, similar to the above described top layer 161 (refer to FIG. 7A and FIG. 8). With this arrangement, it is possible to decrease the adhesion between the underlayer 163 and the adhesive layer 152, thereby preventing the transfer layer IK formed after transfer from the ink ribbon IB to the separating agent layer 154 from peeling once again toward the adhesive layer 152 side.

Advantages of the Embodiment

Thus, as described above, according to this embodiment, it is possible to achieve the adhesive tape 150" with print with optimal characteristics that is capable of maintaining antifouling properties when affixed and used by the user while improving the separability at the time of feed-out from the third roll R3. Further, according to this embodiment, it is possible to also improve the transferability from the ink ribbon IB and, in this way as well, achieve the adhesive tape 150" with print with optimal characteristics.

Further, in particular, according to this embodiment, the SP value of the olefin resin separating agent (or acrylic resin separating agent comprising a long-chain alkyl group) that constitutes the separating agent layer 154 is greater than or equal to 7 and less than or equal to 9. With this arrangement, it is possible to reliably improve the separability of the adhesive layer 152 from the separating agent layer 154 when the adhesive tape 150" with print is fed out from the third roll R3 as previously described, and peel the adhesive layer 152 via a lighter load.

Further, in particular, according to this embodiment, the SP value of the adhesive that constitutes the adhesive layer 152 is greater than 9 and less than or equal to 14. With this arrangement, it is possible to reliably decrease the adhesion of the adhesive layer 152 with respect to the separating agent layer 154 for which the SP value is lowly set as described above.

Further, in particular, according to this embodiment, the adhesive that constitutes the adhesive layer 152 is an acrylic adhesive. Using an acrylic adhesive with a high SP value in this manner makes it possible to reliably decrease the adhesion with respect to the separating agent layer 154 for which the SP value is lowly set.

Further, in particular, according to this embodiment, the transfer layer IK transferred from the ink ribbon IB to the print-receiving adhesive tape 150 forms a three-layered structure. That is, the transfer layer IK includes the underlayer 163, the ink layer 162, and the top layer 161, from the other side to one side in the above described thickness direction. This structure is one in which the ink layer 162 is sandwiched between the underlayer 163 and the top layer 161, and thus the ink layer 162 is unrelated to the adhesion settings (adhesion levels) between the aforementioned transfer layer IK, the separating agent layer 154, and the adhesive layer 152. Accordingly, it is possible to suitably change the pigment of the ink layer 162 to a type that can achieve the color preferred by the user without inhibiting optimum characteristics, such as the separability and transferability previously described, thereby improving convenience.

Further, compared to the relatively low SP value of the underlayer 163, which is greater than or equal to 7 and less than or equal to 9, the SP value of the ink layer 162 is higher (greater than 9 and less than or equal to 11), and thus the values of the adhesive force between the underlayer 163 and the first ink layer 162 relatively decreases. With this arrangement, when the adhesive layer 152 is peeled as it is fed out from the third roll R3 as previously described, only the underlayer 163 that contacts the adhesive layer 152 is peeled in association with the adhesive layer, and the first ink layer 162 is separated from that peeled underlayer 163, remaining on the separating agent layer 154 side, even in a case where the transfer layer IK also temporarily appears as if it will be peeled together with the adhesive layer 152. With this arrangement, even if such peeling as described above temporarily occurs, it is possible to at least avoid loss of color by the transfer layer IK. As a result, the print-based display function of the adhesive tape 150" with print can be reliably maintained.

Note that the present disclosure is not limited to the above described embodiment, and various modifications may be made without deviating from the spirit and scope of the disclosure. The following describes such modifications one by one.

(1) When the SP Value of the Ink Layer is Decreased

That is, as shown in FIG. 7B, according to this modification, an ink layer 162' comprising a predetermined pigment and a relatively low SP value greater than or equal to 7 and less than or equal to 9 is provided in place of the ink layer 162 of the above described embodiment, between the underlayer 163 and the top layer 161 of a transfer layer IK.

In this modification, similar to the above described embodiment, the structure is one in which the ink layer 162' is sandwiched between the underlayer 163 and the top layer 161, and thus the ink layer 162' is unrelated to the adhesion settings (adhesion levels) between the aforementioned transfer layer IK, the separating agent layer 154, and the adhesive layer 152. Accordingly, it is possible to suitably change the pigment of the ink layer 162' to a type that can achieve the color preferred by the user without inhibiting optimum characteristics, such as the separability and transferability previously described, thereby improving convenience.

Further, the SP values of the underlayer 163, the ink layer 162', and the top layer 161 are all substantially the same value of greater than or equal to 7 and less than or equal to 9, and thus the values of the adhesive force between the underlayer 163, the second ink layer 162', and the top layer 161 relatively increase, respectively. With this arrangement, when the adhesive layer 152 is peeled as it is fed out from the third roll R3 as previously described, the underlayer 163, the second ink layer 162', and the top layer 162 become integrated and remain on the separating agent layer 154 side without peeling in association with the adhesive layer 152. With this arrangement, it is possible to reliably maintain the print-based display function of the adhesive tape 150" with print.

(2) When the Top Layer is Omitted

That is, as shown in FIG. 7C, according to this modification, in a transfer layer IK", the top layer 161 of the transfer layer IK' of the above described FIG. 7B is omitted and an ink layer 162" also serves the function of the above described top layer 161. Accordingly, the adopted ink layer 162" is one with a relatively low SP value greater than or equal to 7 and less than or equal to 9, for example. This ink layer 162" comprises a predetermined pigment, and is capable of sticking to a transfer target.

In this modification, a transfer layer IK" transferred from the ink ribbon IB to the print-receiving adhesive tape 150 forms a two-layered structure of the underlayer 163 serving as the above described first layer, and the ink layer 162" serving as the above described second layer. With this arrangement, it is possible to reduce costs compared to a case of a three-layered structure.

(3) When the Underlayer is Omitted

That is, as shown in FIG. 7D, according to this modification, in a transfer layer IK''', the underlayer 163 of the transfer layer IK''' of the above described FIG. 7B is omitted and an ink layer 162''' also serves as the function of the above described underlayer 163. Accordingly, the adopted ink layer 162''' is one with a relatively low SP value greater than or equal to 7 and less than or equal to 9, for example.

In this modification, the transfer layer IK''' transferred from the ink ribbon IB to the print-receiving adhesive tape 150 forms a two-layered structure of the ink layer 162''' serving as the above described first layer, and the top layer 161 serving as the above described second layer. With this arrangement, it is possible to reduce costs compared to a case of a three-layered structure.

(4) Other

Note that printing may not be performed, and the adhesive layer 152, the base layer 153, and the separating agent layer 154 only may be wound in the above described third roll R3. In this case as well, it is possible to achieve the advantages of improving separability and maintaining antifouling properties in the same manner as described above at the time of feed-out from the third roll R3 by the separating agent layer 154.

Further, a tape without the separation material 151 may be wound in the first roll R1. In this case, using not only the above described olefin resin separating agent or acrylic resin separating agent comprising a long-chain alkyl group but also a silicone separating agent as the separating agent used in the separating agent layer 154 is also conceivable. In such a case, the above described SP value of the separating agent layer 154 is greater than or equal to 7 and less than or equal to 9. In these cases as well, it is possible to achieve the advantage of improving the separability by the separating agent layer 154 at the time of feed-out of the above described tape from the first roll R1, and the advantage of maintaining antifouling properties when the user uses the above described tape after feed-out from the first roll R1, as previously described.

Further, while the above has described an illustrative scenario in which the present disclosure is applied to the adhesive tape printer 1 that performs printing on the print-receiving adhesive tape 150, the present disclosure is not limited thereto, allowing application to a tape processing device that performs processing other than printing on an adhesive tape.

Further, other than that already stated above, techniques based on the above described embodiment and each of the modifications may be suitably utilized in combination as well.

What is claimed is:

1. An adhesive tape-comprising:
a tape base layer having a first surface and a second surface;
an adhesive layer disposed in direct contact with said first surface of said tape base layer and including a predetermined adhesive; and
a separation layer disposed in direct contact with said second surface of said tape base layer and including an olefin resin separating agent,
a solubility parameter value of said olefin resin separating agent constituting said separation layer being greater than or equal to 7 $(cal/cm^3)^{1/2}$ and less than or equal to 9 $(cal/cm^3)^{1/2}$, and
a solubility parameter value of said predetermined adhesive constituting said adhesive layer being greater than 9 $(cal/cm^3)^{1/2}$ and less than or equal to 14 $(cal/cm^3)^{1/2}$, wherein
the adhesive tape further comprises in cross section:
a tape main body including said tape base layer, said adhesive layer, and separation layer; and
transferred layers formed on said tape main body by transfer from an ink ribbon;
said transferred layers including:
a first layer having a solubility parameter value greater than or equal to 7 $(cal/cm^3)^{1/2}$ and less than or equal to 9 $(cal/cm^3)^{1/2}$; and
a second layer having a solubility parameter value greater than or equal to 7 $(cal/cm^3)^{1/2}$ and less than equal to 9 $(cal/cm^3)^{1/2}$.

2. The adhesive tape according to claim 1, wherein:
said predetermined adhesive constituting said adhesive layer is an acrylic adhesive.

3. The adhesive tape according to claim 1, wherein:
said adhesive tape is wound into an adhesive tape roll around a predetermined axis,
said adhesive tape comprising:
a tape base layer having a first surface and a second surface;
an adhesive layer disposed in direct contact with said first surface of said tape base layer and including a predetermined adhesive; and
a separation layer disposed in direct contact with said second surface of said tape base layer and including an olefin resin separating agent,
a solubility parameter value of said olefin resin separating agent constituting said separation layer is greater than or equal to 7 $(cal/cm^3)^{1/2}$ and less than or equal to 9 $(cal/cm^3)^{1/2}$,
a solubility parameter value of said predetermined adhesive constituting said adhesive layer is greater than 9 $(cal/cm^3)^{1/2}$ and less than or equal to 14 $(cal/cm^3)^{1/2}$, and
said separation layer comes into contact with said adhesive layer.

4. The adhesive tape according to claim 1, wherein:
said olefin resin separating agent of said separation layer is a crystalline olefin resin separating agent.

5. The adhesive tape according to claim 1, wherein:
said transferred layers further comprise an ink layer disposed between said first layer and said second layer, and having a solubility parameter value greater than 9 $(cal/cm^3)^{1/2}$ and less than or equal to 11 $(cal/cm^3)^{1/2}$, and comprised of a pigment,
said first layer is an underlayer that is melted by heat reception and separated from a ribbon base layer of said ink ribbon and
said second layer is a top layer stuck to said separation layer.

6. The adhesive tape according to claim 1, wherein:
said transferred layers further comprise an ink layer disposed between said first layer and said second layer, and having a solubility parameter value greater than or equal to 7 $(cal/cm^3)^{1/2}$ and less than or equal to 9 $(cal/cm^3)^{1/2}$, and comprised of a pigment,
said first layer is an underlayer that is melted by heat reception and separated from a ribbon base layer of said ink ribbon, and
said second layer is a top layer stuck to said separation layer.

7. The adhesive tape according to claim 1, wherein:
said first layer is an underlayer that is melted by heat reception and separated from a ribbon base layer of said ink ribbon, and
said second layer is an ink layer comprised of a pigment and stuck to said separation layer.

8. The adhesive tape according to claim 1, wherein:
said first layer is a layer that is melted by heat reception and separated from a ribbon base layer of said ink ribbon, and
said second layer is a top layer stuck to said separation layer.

* * * * *